United States Patent
Ishikawa et al.

[11] 4,086,605
[45] Apr. 25, 1978

[54] DIAPHRAGM DEVICE

[75] Inventors: Kazuo Ishikawa; Keiichi Sakaguchi, both of Yokohama; Tomoshi Takigawa, Machida; Noritsugu Hirata, Yokohama; Akira Tajima, Kawasaki; Sadahiko Tsuji, Yokohama, all of Japan

[73] Assignee: Canon Kabushiki Kaisha, Tokyo, Japan

[21] Appl. No.: 696,548

[22] Filed: Jun. 16, 1976

[30] Foreign Application Priority Data
Jun. 20, 1975   Japan .................................. 50-76129

[51] Int. Cl.² ............................................... G03B 17/38
[52] U.S. Cl. ...................................... 354/270; 354/40; 350/206
[58] Field of Search .................. 352/141; 354/40, 270, 354/271, 272, 273, 274; 350/206

[56] References Cited
U.S. PATENT DOCUMENTS

| | | | |
|---|---|---|---|
| 993,431 | 5/1911 | Wollensak | 354/274 |
| 3,442,194 | 5/1969 | Sho | 354/273 |
| 3,633,486 | 1/1972 | Asazuma | 352/141 |
| 3,846,807 | 11/1974 | Sekine | 354/271 |
| 4,009,946 | 3/1977 | Geyer | 354/274 |

Primary Examiner—Monroe H. Hayes
Attorney, Agent, or Firm—Toren, McGeady and Stanger

[57] ABSTRACT

In a diaphragm device for use in an optical instrument such as a camera and having two or more diaphragm blades movable across an imaging path of rays and arranged in axially displaced relation from each other to define a common aperture of variable size, there is provided means formed in a portion of at least one of the diaphragm blades to substantially either eliminate or reduce the axial displacement between the diaphragm blades at a relatively small aperture region, whereby the distribution of light energy is made uniform over the entire area of the image.

12 Claims, 12 Drawing Figures

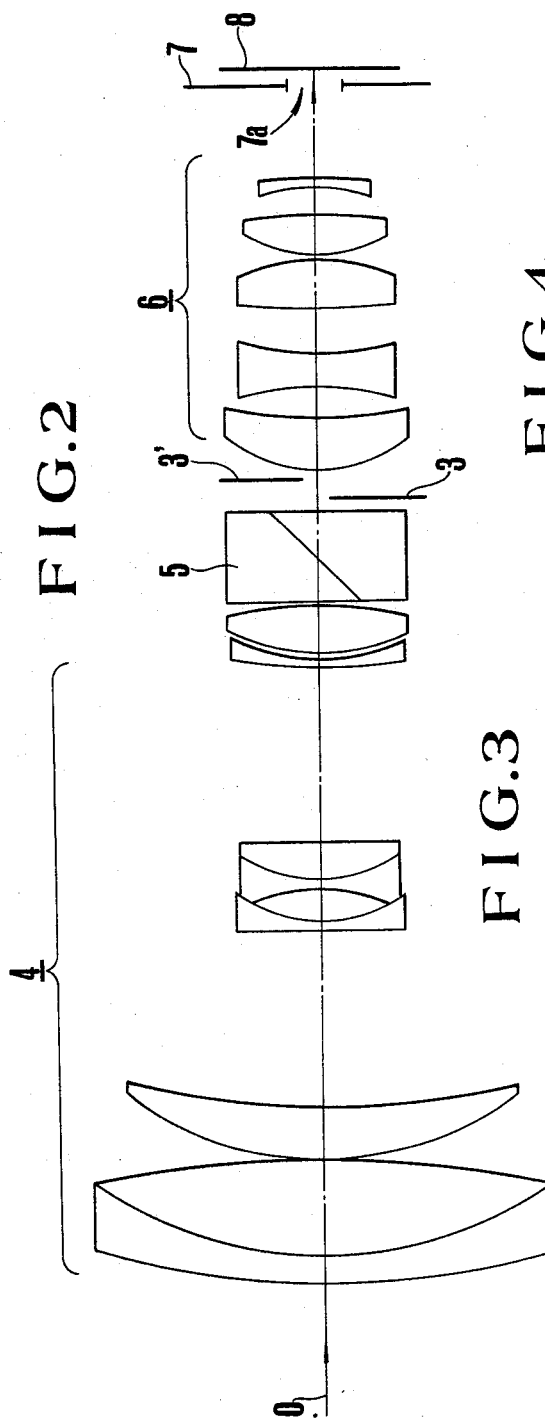
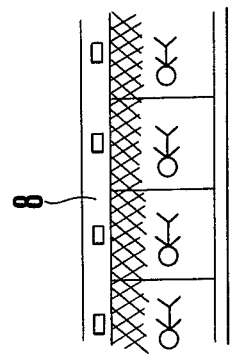
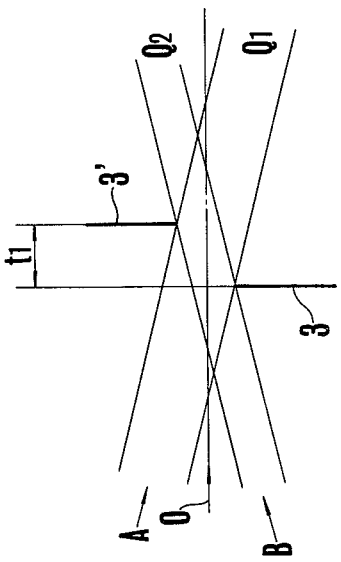
FIG.2
FIG.4
FIG.3

DIAPHRAGM DEVICE

BACKGROUND OF THE INVENTION

1. Field of the Invention

This invention relates to disphragm devices for use in optical instruments such as cameras, and more particularly to a diaphragm device having two or more diaphragm blades arranged across an imaging path of rays in axially displaced relation from each other to define a common exposure aperture of variable size. Still more particularly, it relates to an improvement in structure of the aforesaid diaphragm blades.

2. Description of the Prior Art

At present, most diaphragm devices adapted for use in, for example, motion picture cameras, are of the type having two diaphragm blades, at least one of which is arranged to be movable in linkage with the output shaft of an exposure meter cooperating with an exposure value computing circuit to automatically adjust the size of exposure aperture of the camera. The other diaphragm blade may be fixed stationary, or otherwise movably linked with the first-named diaphragm blade.

In arranging these two diaphragm blades to define a common exposure aperture of which the size is controlled in accordance with the output of the exposure meter accurately and reliably, and also for the purpose of reducing the driven load for the exposure meter itself, in other words, of permitting the employment of an exposure meter having a very small driving torque is controlling movement of the diaphragm blades, it is usual to axially displace the diaphragm blades from each other by a distance sufficiently large to prevent intimate contact therebetween, and therefore production of frictional force therebetween during the aperture-adjusting operation.

This axial separation of these two diaphragm blades gives rise to a problem which becomes serious when the sizes of exposure aperture is decreased to a relatively small value with increase in the level of brightness of a scene being photographed. As a result of such problem, it is impossible to make a uniform exposure of the photographic film as is understandable from the fact that the axial displacement of the diaphragm causes the effective oblique pencile of different angular extent to reach the film.

SUMMARY OF THE INVENTION

With the aforesaid inconvenience of the conventional diaphragm device of wide use in mind, it is the principal subject of the present invention, as particularly applied to a diaphragm device of the type having two or more diaphragm blades arranged in axially displaced relation from each other, to eliminate objectionable influence such as the dependence of the imaging ray distribution on the angular extent of oblique pencil resulting from the axial separation of the diaphragm blades particularly when the diaphragm blades are operated to define an exposure aperture of decreased size by very simple means.

Another object of the present invention along with the aforesaid subject is to provide a novel, simple and improved diaphragm blade structure adapted for use in a diaphragm device of the type described which has found its wide use, for example, in motion picture cameras and capable of eliminating all bad effect due to the axially displaced diaphragm blades without causing unduely large modification in the structure of the aforesaid diaphragm device.

This subject and object of the invention have been accomplished in a manner, though will become apparent from the following description, according to the principle of the present invention, such that at least one of the two or more diaphragm blades arranged in axially displaced relation from each other is provided with means formed in a portion thereof to substantially eliminate or reduce the above-identified axial separation when the diaphragm blades are set to define a small exposure aperture.

Other objects and features of the present invention will become apparent from the following detailed description of preferred embodiments taken in conjunction with the accompanying drawings in which:

BRIEF DESCRIPTION OF THE DRAWINGS

FIG. 2 is a schematic sectional view, partly in block form, of the two diaphragm blades of FIG. 1 arranged in a space within an optical objective of the camera to be movable in radial directions on respective opposite sides of the optical axis while being axially displaced from each other.

FIG. 3 is a diagram of geometry considered to prove that two effective oblique pencils of the same angle of incidence but of opposite sign have largely different diameters from each other when the diameter of an exposure aperture defined thereby is small as compared with the axial separation therebetween.

FIG. 4 is a fragmentary view of a film strip having images as taken from a scene of high brightness level by the camera of FIGS. 1 to 3 with the resulting uneven image density distribution.

DETAILED DESCRIPTION OF THE PREFERRED EMBODIMENTS

Prior to the disclosure of the present invention, a conventional diaphragm device of the type which has so far found its general use in motion picture cameras will be explained with reference to FIGS. 1 to 4.

Figure 1:
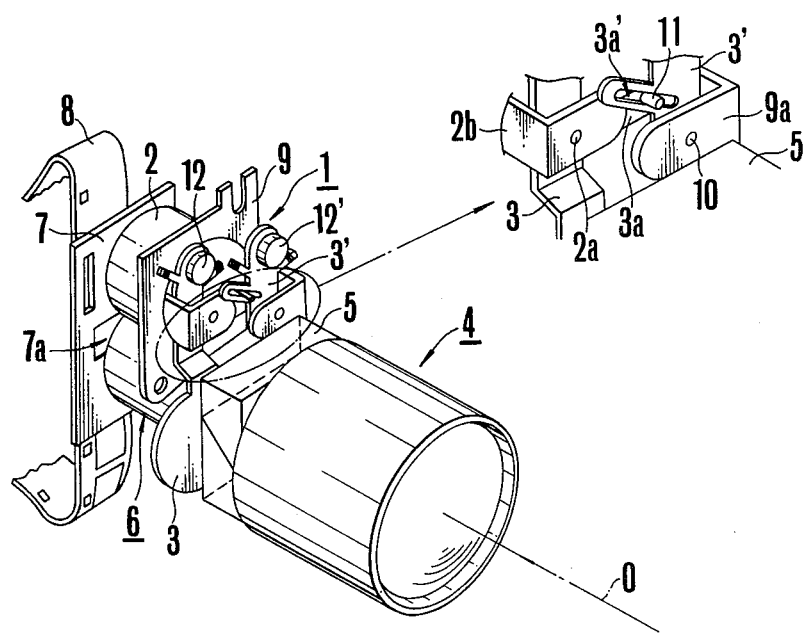
FIG. 1 is a perspective view of a conventional diaphragm device of the type which has found its general use in motion picture cameras and the like with the pivoting and linking mechanism of its two diaphragm blades being shown in more detail.

As shown in FIG. 1, the conventional diaphragm device which is generally indicated at 1 cooperative with an exposure meter 2 comprises first and second diaphragm blades 3 and 3' pivoted at movable and fixed pins 2a and 10 respectively. The movable pivot pin 2a functions as an output shaft of the exposure meter 2 having an input terminal connected to the output terminal of an exposure value computing circuit not shown, and is supported by the first bent arm 2b extending from a protection frame 9 for the exposure meter 2, while the fixed pivot pin 10 is planted in a second bent arm 9a extending from the protection frame 9. The first and second diaphragm blades 3 and 3' are linked with each other through a slot 3'a-and-pin 11 connection, the slot 3'a of linear or curved configuration being provided in the upwardly extending portion of the second diaphragm blade 3', and the pin 11 being planted on an extension 3a of the first diaphragm blade 3. Balance weights 12 and 12' are provided as fixedly mounted on the respective opposite end portions of the levers to those having diaphragm blades 3 and 3' respectively. The first and second diaphragm blades 3 and 3' are positioned in a space between a light-splitting prism 5 behind a front lens assembly 4 of a camera objective lens and a rear lens assembly 6 thereof to be movable in radial directions with respect to the optical axis of the objective to define a common exposure aperture of variable size for the objective lens. 7 is an aperture plate having an exposure gate 7a formed therein through which a film 8 is exposed to an image-forming light coming from the objective 4, 6.

With this construction and arrangement of the conventional diaphragm device of FIG. 1, it is possible to control the size of an exposure aperture defined by the diaphragm blades 3 and 3' in accordance with the output of the exposure value computing circuit of the camera to effect correct exposure of the film 8, as the exposure meter 2 responsive to the output of the computing circuit turns the output shaft 2a causing simultaneous pivotal movements of the first and second diaphragm blades 3 and 3' through the cam follower pin 11-and-slot 3'a connection.

As schematically shown in FIG. 2, the diaphragm blades 3 and 3' of the diaphragm device 1 are arranged on the respective opposite sides, namely, left and right sides, as viewed in FIG. 1, of the optical axis O in axially displaced relation from each other, so that the inner open ends of the diaphragm blades 3 and 3' are moved in a radial direction to define the size of an exposure aperture as a function of the level of brightness of a scene being photographed, while ensuring that the movement of the blades 3 and 3' cannot be changed by accidental frictional contact with each other to permit accurate and reliable control of the exposure aperture. Another advantage of this axial separation of the diaphragm blades 3 and 3' is that an exposure meter having a decreased driving torque may be selected for employment as a means for driving the diaphragm device 1.

As the level of brightness of the scene is increased with decrease in the size of the diaphragm aperture, the axial separation $t_1$ between the diaphragm blades 3 and 3' becomes an increasingly important factor in controlling the distribution of light energy on the image plane, as shown in FIG. 3. The oblique pencil A under an angle of incidence having the positive sign with respect to the optical axis has a larger diameter than that under the same angle of incidence but having the negative sign. Letting Q1 denote the quantity of light energy of the oblique pencil A and Q2 that of the oblique pencil B, we have $$Q1 > Q2$$

As a result, the film 8 after have been exposed by use of the camera of FIG. 1 and processed produces images of uneven density as shown in FIG. 4, wherein the cross-hatched portion indicates under-exposure.

Figure 5:
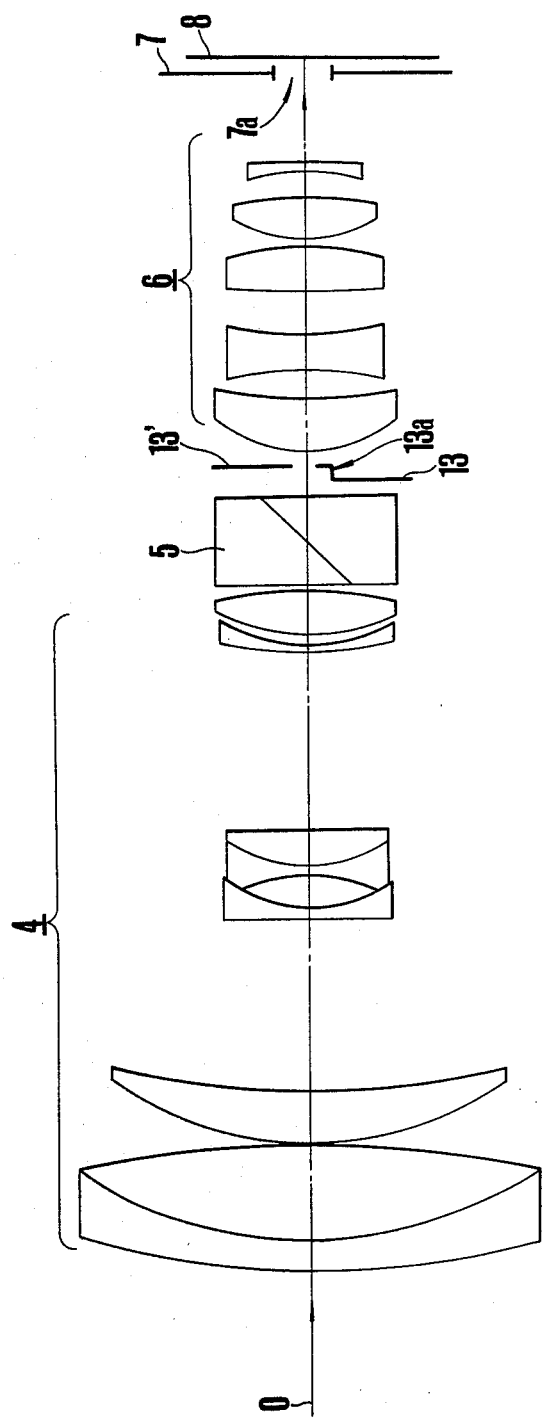
FIG. 5 is a schematic sectional view of an embodiment of a diaphragm blade assembly according to the present invention as adapted for use in a diaphragm device of the type shown in FIG. 1.
Figure 6:
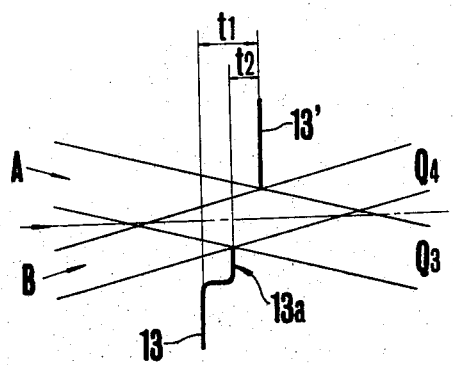
FIG. 6 is a diagram of geometry considered to prove that the difference of diameter between two effective oblique pencils of the same angle of incidence but of opposite sign is decreased from that of FIG. 3.
Figure 7:
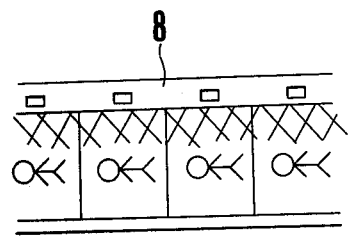
FIG. 7 is a fragmentary view of a film strip as taken from a scene of the same high brightness level as that of FIG. 4 by the camera of FIGS. 5 and 6 with the resulting image density distribution being made more uniform than that of FIG. 4.

Referring now to FIGS. 5, 6 and 7, there is schematically shown the principle of the present invention as applied to the same type diaphragm device as that of FIG. 1 in that the number of diaphragm blades is two, and the adaptation is made for use in a motion picture camera of the same construction as that shown in FIGS. 1 and 2 particularly with respect to the front and rear lens assemblies 4 and 6, prism 5, apertured plate 7, exposure meter 2, and mechanical linkages between the exposure meter 2 and the diaphragm blade assembly and between the first and second diaphragm blades 3 and 3'.

According to the present invention, one of the two diaphragm blades 13 and 13', in this instance, the first diaphragm blade 13 is provided with means 13a formed in a small aperture open-end portion thereof for substantially reducing the axial separation $t_1$ between the first and second diaphragm blades 3 and 3' to a smaller one $t_2$ as shown in FIG. 6 when the diaphragm device is adjusted to a small aperture setting. Since the diameters of olique pencils A and B of FIG. 6 are smaller and larger than those of the oblique pencils A and B of FIG. 3, we have $$Q1 > Q3 > Q4 > Q2$$

wherein Q3 and Q4 are the quantities of light energy of the pencils A and B of FIG. 6 respectively. The film strip 8, after having been exposed through the diaphragm device of the invention and processed, produces images with the cross-hatched portions being under-exposed in a less degree than in the prior art shown in FIG. 4.

Figure 8:
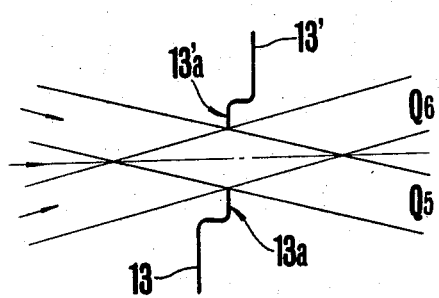
FIG. 8 is a diagram of geometry considered to prove that a further improvement of the diaphragm blades of FIGS. 5 and 6 according to the invention leads to substantial elimination of difference between the diameter of two effective oblique pencils under the same angle of incidence but of opposite sign.
Figure 9:
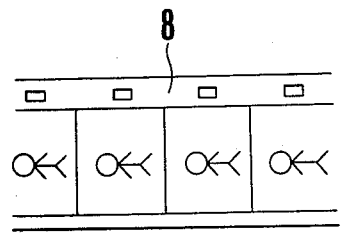
FIG. 9 is a fragmentary view of a film strip having images as taken from a scene of the same brightness level as that of FIG. 4 or FIG. 7 by the camera having the diaphragm blades of FIG. 8 with the resulting image density distribution being made completely uniform.

FIG. 8 shows a further improvement of the diaphragm blade structure as the second diaphragm blade 13' is also provided with a means of an identical function to that of the means provided in the first diaphragm blade 13 for substantially eliminating the axial separation between the small aperture open-ends of the first and second blades 13 and 13' so that the oblique pencils A and B of FIG. 8 have almost the same diameter. The film strip 8, after having been exposed through the diaphragm device of FIG. 8 and processed, produces images of very good quality as the exposure can be made almost completely uniform as shown in FIG. 9.

Figure 10:
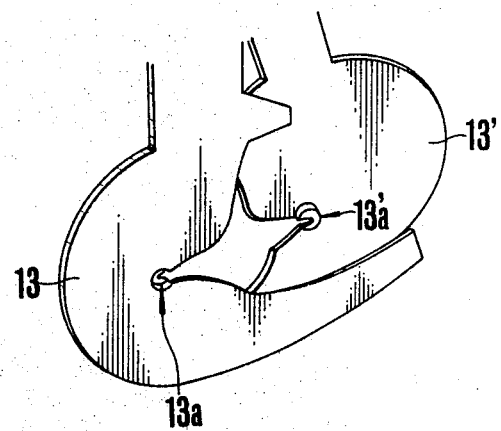
FIG. 10 is a perspective view on an enlarged scale of two diaphragm blades each provided with means formed at its small aperture open-end in accordance with the invention to provide the same effect and result as those of FIGS. 8 and 9.
Figure 11:
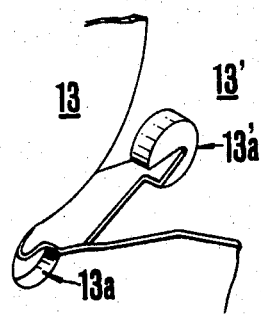
FIG. 11 is a fragmentary perspective view on a more enlarged scale of two diaphragm blades provided with an example of the above-identified means.
Figure 12:
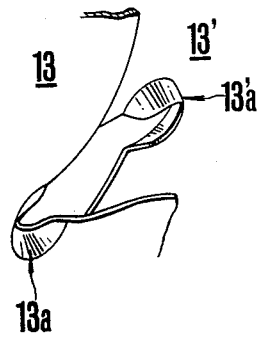
FIG. 12 is a similar view of another example of the above-identified means.

FIG. 10 shows an example of the construction and arrangement of the two diaphragm blades 13 and 13' and particularly the location of the separation-reducing means 13a and 13'a. In forming these means 13a and 13'a any conventional technique such as the embossing or the barring may be employed with the result being shown in FIG. 11, or 12 respectively.

It will be appreciated from the foregoing that the present invention provides a diaphragm device capable of minimizing the light energy difference from image-point to point even when the size of a diaphragm aperture is decreased to a minimum possible level without sacrificing the accuracy and reliability of the exposure aperture control by an exposure meter having a very small driving torque, thereby improving the uniformity of exposure over the entire area of an image which has heretofore been impossible due to the axially displaced arrangement of the diaphragm blades from each other.

While the present invention has been illustrated and described as embodied in a particular type of diaphragm devices for motion picture cameras, it is not intended to be limited to the details shown, since the schematically shown principle of the invention is applicable to other types of diaphragm devices for use in various optical instruments including still cameras.

What is claimed is:

1. A diaphragm device to regulate the amount of light passing therethrough, comprising:
   at least two light intercepting blades which respectively have openings to allow light to pass therethrough and define one diaphragm aperture to regulate an amount of light passing therethrough by having each of said openings mutually cooperate, said blades being arranged in an overlapping relationship to each other with a certain space therebetween to avoid contact with each other and operating to vary a diaphragm aperture to regulate the amount of light passing therethrough by being relatively shifted while maintaining said space therebetween, at least one of said blades having an opening part formed in a manner protruding to a side facing to the other of said blades for defining said diaphragm aperture with a small diameter at a position closer to the other of said blades, said opening part being formed in correspondence to a particular portion of the opening of said at least one blade to define a diaphragm aperture with a small diameter.

2. A diaphragm device according to claim 1, wherein said opening part is formed at said at least one blade in a manner avoiding contact with said other blade when defining a diaphragm aperture with a small diameter.

3. A diaphragm device according to claim 1, wherein said opening part is formed at said at least one blade in a manner enabling contact with said other blade when defining a diaphragm aperture with a small diameter.

4. A diaphragm device to regulate the amount of light which reaches said device through an objective lens means having an optical axis and which passes therethrough, said device comprising:
   a first light intercepting blade having a first opening to allow light to pass therethrough, said first blade being provided within a first plane almost perpendicular the optical axis of said objective lens means, and
   a second light intercepting blade having a second opening to allow light to pass therethrough, said second blade being provided within a second plane almost parallel to said first plane and separated from said first plane by a very small space and in an overlapping relationship with the first plane, said second blade operating to define one diaphragm aperture to regulate the amount of light passing therethrough by having said second opening cooperate with said first opening at said first blade, said second blade further having an opening part formed in a manner protruding to a side facing to said first blade to define said diaphragm aperture with a small diameter at a position closer to said first blade, said opening part being formed corresponding to a part of said second opening applied particularly to define a diaphragm aperture with a small diameter.

5. A diaphragm device according to claim 4, wherein said first light intercepting blade is further provided with an opening part formed in a manner protruding to a side facing to said second blade to define a diaphragm aperture with a small diameter at a position closer to said second light intercepting blade when defining said diaphragm aperture with a small diameter, said opening part of the first blade being formed corresponding to a part of said first opening applied particularly to define a diaphragm aperture with a small diameter and defining said diaphragm aperture with a small diameter by cooperating with said opening part provided at said second blade.

6. A diaphragm device according to claim 5, further comprising driving means electrically connected with exposure measuring circuit means and responsive to the output of the circuit means, said driving means having an output member, said first light intercepting blade being operatively connected with said output member of the driving means and driven by the output member so as to operate within said first plane, while said second light intercepting blade is operatively connected with said first blade and driven by said first blade so as to operate within said second plane.

7. A diaphragm device according to claim 5, wherein each of said opening parts at said first and second blades is formed respectively at the first and second blades in a manner avoiding contact with each other when defining a diaphragm aperture with a small diameter.

8. A diaphragm device according to claim 5, wherein each of the opening parts at said first and second blades is formed respectively at the first and second blades in a manner enabling contact with each other when defining a diaphragm aperture with a small diameter.

9. A diaphragm device according to claim 4, further comprising driving means electrically connected with exposure measuring circuit means and responsive to the output of the circuit means, said driving means having an output member, said first light intercepting blade being operatively connected with said output member of the driving means and driven by the output member so as to operate within said first plane, while said second light intercepting blade is operatively connected with said first blade and driven by the first blade so as to operate within said second plane.

10. A diaphragm device according to claim 4, further comprising driving means electrically connected with exposure measuring circuit means and responsive to the output of the circuit means, said driving means having an output member, said second light intercepting blade being operatively connected with said output member of the driving means and driven by the output member so as to operate within said second plane, while said first light intercepting blade is operatively connected with said second blade and driven by the second blade so as to operate within said first plane.

11. A diaphragm device according to claim 4, wherein said opening part at the second blade is formed at the second blade in a manner avoiding contact with said first blade when defining diaphragm aperture with small diameter.

12. A diaphragm device according to claim 4, wherein said opening part at the second blade is formed at the second blade in a manner enabling contact with said first blade when defining a diaphragm aperture with a small diameter.

* * * * *